US008692493B2

(12) United States Patent
Hall et al.

(10) Patent No.: US 8,692,493 B2
(45) Date of Patent: Apr. 8, 2014

(54) METHODS, APPARATUSES, AND SYSTEMS FOR SPEED CONTROL OF A MOVABLE PARTITION

(75) Inventors: Duane O. Hall, Sandy, UT (US); E. Carl Goodman, Bountiful, UT (US); W. Michael Coleman, Salt Lake City, UT (US); John G. Garrett, III, Magna, UT (US)

(73) Assignee: Won-Door Corporation, Salt Lake City, UT (US)

( * ) Notice: Subject to any disclaimer, the term of this patent is extended or adjusted under 35 U.S.C. 154(b) by 199 days.

(21) Appl. No.: 13/178,621

(22) Filed: Jul. 8, 2011

(65) Prior Publication Data
US 2013/0008618 A1    Jan. 10, 2013

(51) Int. Cl.
*H02P 6/14*    (2006.01)
(52) U.S. Cl.
CPC ......................................... *H02P 6/14* (2013.01)
USPC ............ 318/400.26; 318/400.29; 318/400.01; 318/700
(58) Field of Classification Search
CPC ........................................................ H02P 6/14
USPC .................... 318/400.26, 400.29, 400.01, 700
See application file for complete search history.

(56) References Cited

U.S. PATENT DOCUMENTS

| 3,289,741 | A | 12/1966 | Gossling |
| 4,432,031 | A | 2/1984 | Premerlani |
| 4,834,161 | A | 5/1989 | Johnson et al. |
| 4,924,929 | A | 5/1990 | Johnson et al. |
| 4,937,624 | A * | 6/1990 | Kohtani et al. ............... 399/226 |
| 5,150,030 | A * | 9/1992 | Ito et al. ......................... 318/811 |
| 5,703,463 | A | 12/1997 | Smith |
| 5,726,373 | A | 3/1998 | Choi et al. |
| 5,937,883 | A * | 8/1999 | Camara .............................. 135/87 |
| 6,055,145 | A | 4/2000 | Lagree et al. |
| 6,094,255 | A * | 7/2000 | Ota ................................. 355/75 |
| 6,662,848 | B2 | 12/2003 | Goodman et al. |

(Continued)

FOREIGN PATENT DOCUMENTS

| JP | 07-071167 | 3/1995 |
| JP | 09-296648 | 11/1997 |
| KR | 10-2005-0104537 | 11/2005 |

OTHER PUBLICATIONS

PCT International Search Report and Written Opinion of the International Searching Authority for PCT/US2012/038378, dated Sep. 7, 2012, 6 pages.

*Primary Examiner* — Bentsu Ro
*Assistant Examiner* — David Luo
(74) *Attorney, Agent, or Firm* — TraskBritt

(57) ABSTRACT

A movable partition system includes a movable partition including coupled panels and a lead post engaged with and movable along a track. A motor control system includes a motor coupled to the movable partition and a switching circuit coupled to the motor and for selectively coupling the motor to a positive power source and a negative power source responsive to one or more PWM signals. An encoder is configured for generating one or more rotation signals indicative of operational direction and operational speed of the motor. A motor controller is coupled to the switching circuit and is configured for improving airflow around the panels of the movable partition when the lead post of the movable partition is between a predefined position and a fully retracted position indicative of a billowing effect for the panels by adjusting pulse widths of the PWM signals to control rotational speed of the motor.

26 Claims, 8 Drawing Sheets

(56) References Cited

U.S. PATENT DOCUMENTS

| | | |
|---|---|---|
| 6,760,437 B1 | 7/2004 | Lim |
| 6,812,668 B2 * | 11/2004 | Akiyama ............... 318/610 |
| 6,947,271 B1 | 9/2005 | Gronowicz, Jr. |
| 7,211,975 B2 | 5/2007 | Murray et al. |
| 7,292,418 B2 | 11/2007 | Egner |
| 7,342,370 B2 | 3/2008 | Greene et al. |
| 7,503,205 B2 | 3/2009 | Baillargeon et al. |
| 7,503,594 B2 | 3/2009 | Peacock et al. |
| 2005/0131606 A1 | 6/2005 | Motozawa et al. |
| 2006/0002043 A1 | 1/2006 | DiSalvo et al. |
| 2006/0087939 A1 | 4/2006 | Kuwayama |
| 2006/0144529 A1 | 7/2006 | Hemphill |
| 2007/0074089 A1 | 3/2007 | Matsumoto |
| 2007/0124014 A1 | 5/2007 | Kim |
| 2007/0176578 A1 | 8/2007 | Tsugawa et al. |
| 2008/0165461 A1 | 7/2008 | Paik et al. |
| 2008/0184623 A1 | 8/2008 | Heigl et al. |
| 2011/0000625 A1 | 1/2011 | George |

* cited by examiner

METHODS, APPARATUSES, AND SYSTEMS FOR SPEED CONTROL OF A MOVABLE PARTITION

TECHNICAL FIELD

Embodiments of the present invention are directed to the field of movable partitions used for partitioning space, as sound barriers, as fire barriers, security barriers, and for various other applications.

BACKGROUND

Movable partitions are utilized in numerous situations and environments for a variety of purposes. Such partitions may include, for example, a movable partition comprising foldable or collapsible doors configured to enclose or subdivide a room or other area. Often such partitions may be utilized simply for purposes of versatility in being able to subdivide a single large room into multiple smaller rooms. The subdivision of a larger area may be desired, for example, to accommodate multiple groups or meetings simultaneously. In other applications, such partitions may be utilized for noise control depending, for example, on the activities taking place in a given room or portion thereof.

Movable partitions may also be used to provide a security barrier, a fire barrier, or both a security barrier and a fire barrier. In such a case, the partition barrier may be configured to automatically close upon the occurrence of a predetermined event such as the actuation of an associated alarm. For example, one or more accordion or similar folding-type partitions may be used as a security barrier, a fire barrier, or both a security barrier and a fire barrier wherein each partition is formed with a plurality of panels connected to one another with hinges. The hinged connection of the panels allows the partition to fold and collapse into a compact unit for purposes of storage when not deployed. The partition may be stored in a pocket formed in the wall of a building when in a retracted or folded state. When the partition is deployed to subdivide a single large room into multiple smaller rooms, secure an area during a fire, or for any other specified reason, the partition may be extended along an overhead track, which is often located above the movable partition in a header assembly, until the partition extends a desired distance across the room.

When deployed, a leading end of the movable partition, often defined by a component known as a lead post, complementarily engages another structure, such as a wall, a post, or a lead post of another door.

Automatic extension and retraction of the movable partition may be accomplished through the use of a motor located in a pocket formed in the wall of a building in which the movable partition is stored when in a retracted or folded state. The motor, which remains fixed in place within the pocket, may be used to drive extension and retraction of the movable partition. A motor for automatically extending and retracting a movable partition may also be mounted within the movable partition itself, such that the motor travels with the movable partition as the movable partition is extended and retracted using the motor.

As the movable partition extends and retracts between a closed and open position various stresses may be placed on the movable partition and the motor. The inventors have appreciated that there is a need for apparatuses, and methods for moving and controlling a movable partition to reduce stresses on the movable partition, the motor, or a combination thereof.

BRIEF SUMMARY

Embodiments of the present disclosure include apparatuses, and methods for moving and controlling a movable partition to reduce stresses on the movable partition, the motor, or a combination thereof.

In some embodiments, a motor control system for motivating a movable partition includes a motor for mechanical coupling to the movable partition and a switching circuit operably coupled to the motor for selectively coupling the motor to a positive power source and a negative power source responsive to one or more PWM signals. An encoder is configured for generating one or more rotation signals indicative of operational direction and operational speed of the motor. A motor controller is operably coupled to the switching circuit and is configured for improving airflow around panels of the movable partition when a lead post of the movable partition is between a predefined position and a fully retracted position indicative of a billowing effect for the panels by adjusting pulse widths of the one or more PWM signals to control a rotational speed of the motor.

In other embodiments, a movable partition system includes a movable partition including coupled panels engaged with and movable along a track extending longitudinally between a first end and a second end and a lead post coupled to the movable partition and the track. A motor control system includes a motor for mechanical coupling to the movable partition and a switching circuit operably coupled to the motor for selectively coupling the motor to a positive power source and a negative power source responsive to one or more PWM signals. An encoder is configured for generating one or more rotation signals indicative of operational direction and operational speed of the motor. A motor controller is operably coupled to the switching circuit and is configured for improving airflow around the panels of the movable partition when the lead post of the movable partition is between a predefined position and a fully retracted position indicative of a billowing effect for the panels by adjusting pulse widths of the one or more PWM signals to control a rotational speed of the motor.

In other embodiments, a method of moving a movable partition along a track includes actuating a motor operably coupled to the movable partition to drive rotation of the motor at a rotational speed and cause the movable partition to move along the track at a linear speed proportional to the rotational speed. The method also includes enabling improved airflow around panels of the movable partition when the movable partition reaches a predefined position relative to a fully retracted configuration by reducing the rotational speed of the motor when a lead post of the movable partition is between the predefined position and a fully retracted position.

BRIEF DESCRIPTION OF THE SEVERAL VIEWS OF THE DRAWINGS

While the specification concludes with claims particularly pointing out and distinctly claiming that which is regarded as the present disclosure, the advantages of this disclosure may be more readily ascertained from the description of embodiments of the disclosure when read in conjunction with the accompanying drawings, in which:

DETAILED DESCRIPTION

Figure 1A:
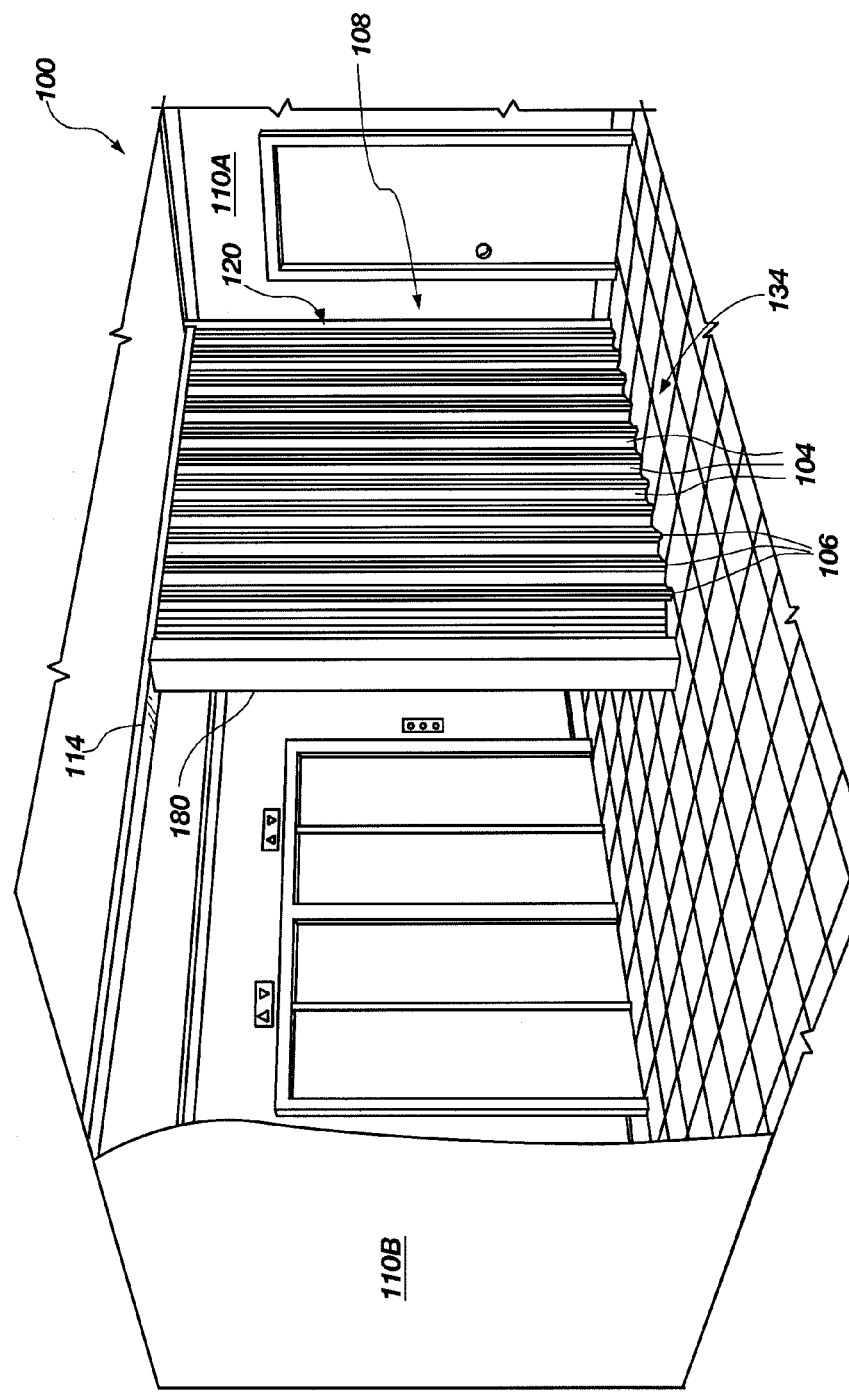
FIGS. 1A through 1C show a perspective view, a side view and a top view, respectively, of a system with a movable partition in accordance with an embodiment of the present disclosure.

In the following description, reference is made to the accompanying drawings in which is shown, by way of illustration, specific embodiments of the present disclosure. The embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer readable media includes both computer storage media and communication media including any medium that facilitates transfer of a computer program from one place to another.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

The terms "assert" and "negate" may be respectively used when referring to the rendering of a signal, status bit, or similar apparatus into its logically true or logically false state. If the logically true state is a logic level one, the logically false state will be a logic level zero. Conversely, if the logically true state is a logic level zero, the logically false state will be a logic level one.

The term "bus" is used to refer to a plurality of signals or conductors, which may be used to transfer one or more various types of information, such as data, addresses, control, or status. Additionally, a bus or a collection of signals may be referred to in the singular as a signal. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

As used herein, the terms "rotating the motor," effecting, causing, or inducing "rotation" of the motor, or a "rotational mode" of the motor, refer to the relative rotational movement between the components of a motor such as a rotor and stator.

Embodiments of the present disclosure include apparatuses, and methods for moving and controlling a movable partition to reduce stresses on the movable partition, the motor, or a combination thereof.

Figure 1B:
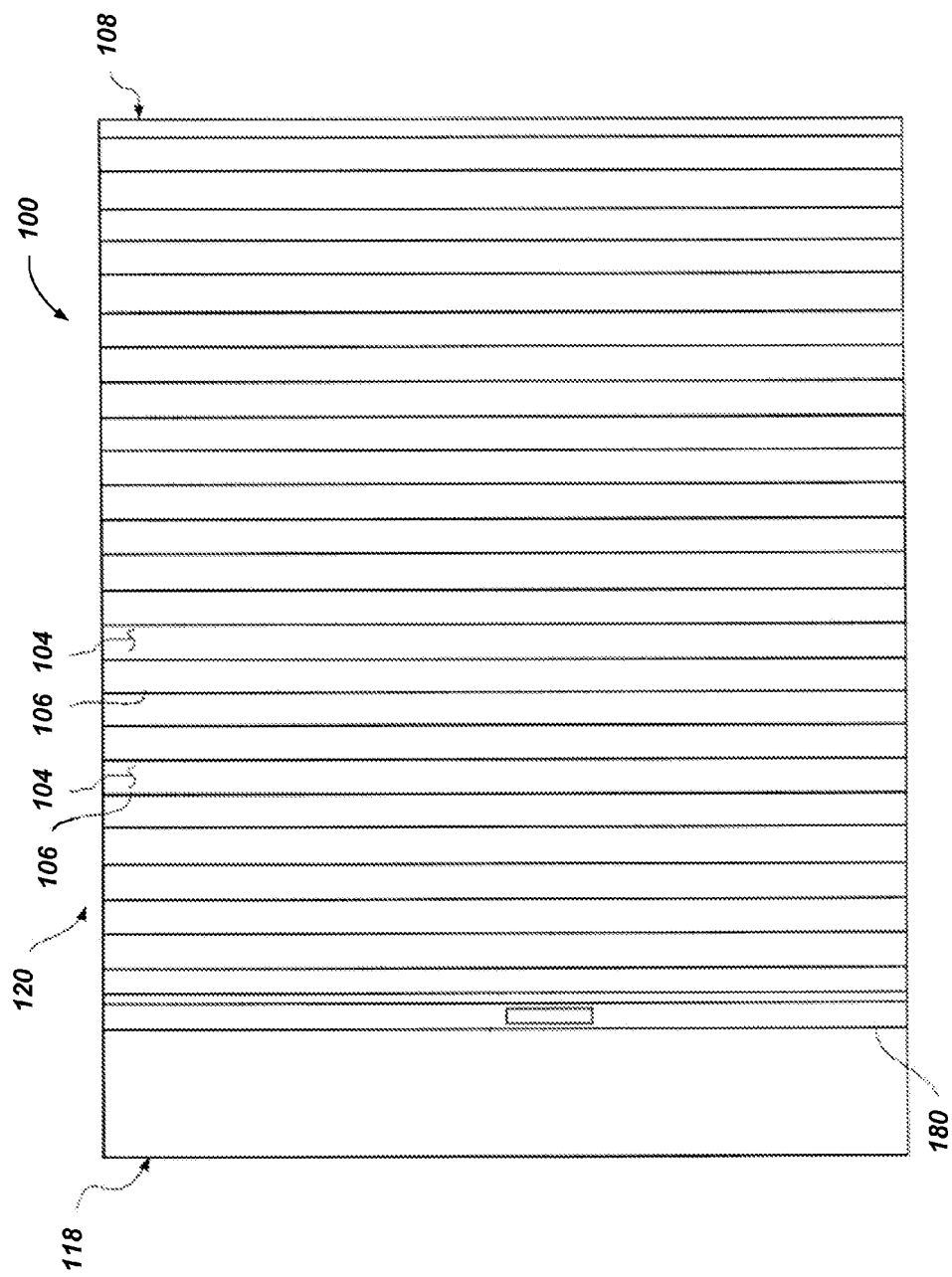
Figure 1C:
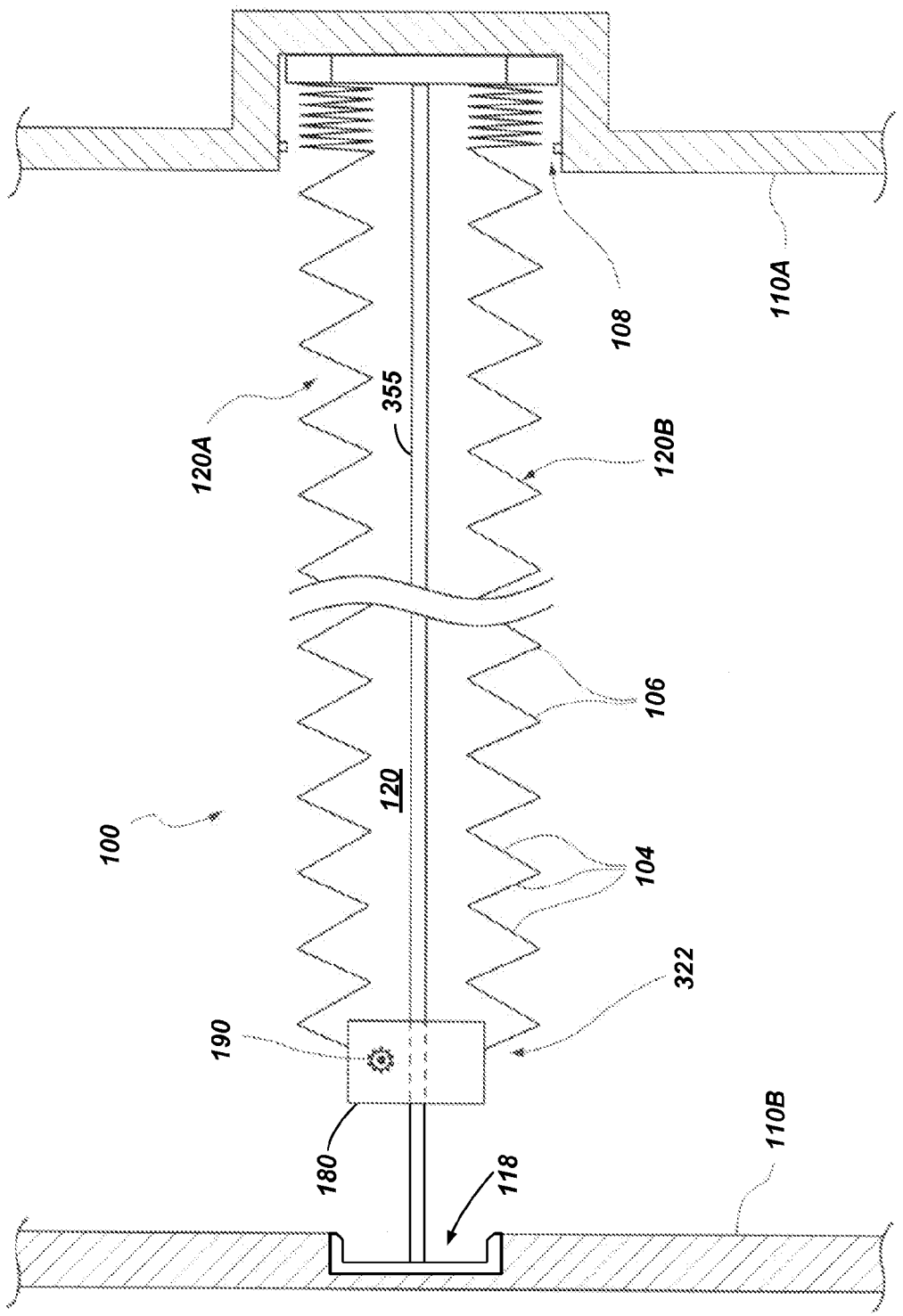

FIGS. 1A through 1C illustrate an embodiment of a movable partition system 100 of the present disclosure. The movable partition system 100 is an automatic movable partition system, in that the system 100 includes a movable partition 120 that may be automatically extended, automatically retracted, or both automatically extended and automatically retracted. The movable partition 120 may be used for partitioning space, as a sound barrier, as a fire barrier, as a security barrier, for combinations of such purposes, or for other purposes.

The movable partition 120 may comprise, for example, an accordion-type door, as shown in FIGS. 1A through 1C. The movable partition 120 may be formed with a plurality of panels 104 that are connected to one another with hinges or other hinge-like members 106. The hinged connection of the panels 104 allows the panels 104 to fold, and the movable partition 120 to collapse, as the movable partition 120 is retracted, which allows the movable partition 120 to be compactly stored in a pocket 108 (may also be referred to herein as a storage compartment) formed in a wall 110A of a building when in a retracted or folded state. In other embodiments, the movable partition 120 may comprise a sliding door, or another type of movable partition 120. As a non-limiting example, the panels 104 may be configured in a manner that they interlock, while still allowing the pivoting between the panels 104 where they are interlocked. For simplicity in explanation, and not for limitation, the pivot-like coupling may be referred to herein as using hinges 106 or couplings 106.

When it is desired to deploy the movable partition 120 to an extended position, the movable partition 120 is driven along a track 114 or track assembly across the space to provide an appropriate barrier. When in a deployed or an extended state, a leading edge of the movable partition 120, shown in the presently described embodiment as a male lead drive box 180, matingly (i.e., complementarily) engages with a jamb or door post 118 that may be formed in a wall 110B of a building. In other embodiments, the lead drive box 180 may simply meet flush with the wall 110B. In some embodiments, the lead drive box 180 and movable partition 120 may extend longitudinally substantially from the track 114 on one surface (e.g., a ceiling) to an opposing surface 134 (e.g., a floor).

As can be seen in FIG. 1C, an accordion-type door 120 may include a first sheet 120A of panels 104 and a second sheet 120B of panels 104 that is laterally spaced from the first sheet 120A. Such a configuration may be utilized as a fire door wherein one sheet 120A acts as a primary fire and smoke barrier, a space between the two sheets 120A and 120B acts as an insulator or a buffer zone, and the second sheet 120B acts as a secondary fire and smoke barrier. Such a configuration may also be useful in providing an acoustical barrier when the movable partition 120 is used to subdivide a larger space into multiple, smaller rooms.

The lead drive box 180, which may include, for example, a drive mechanism 322 with one or more rotatable drive members 190 (e.g., sprockets, gears, and pulleys) for coupling to a fixed drive member 355 (e.g., chains, belts, and cables), which may be configured to open and close the movable partition 120 upon actuation thereof. The movable partition system 100 may further include various sensors and switches to assist in the control of the movable partition 120 through appropriate connection with a motor (not shown).

The example shown herein includes a motor and control circuitry positioned in or near the lead drive box 180. Other embodiments according to the present invention may include the motor and control circuitry positioned in various combinations of in or near the lead drive box 180 or a lead post 180, in or near wall 110A, and in or near wall 110B. In still other embodiments, motors may be mounted in a header on a strike side. Thus, in some embodiments, a chain or belt is fixed and the motor 240 (FIG. 2) (and possibly other electrical components) moves with the movable partition 120. In other embodiments, the motor 240 (and possibly other electrical components) is fixed and the chain or belt moves with the movable partition 120. In general, the description herein discusses a lead post 180 unless the context of the discussion is directed to a lead drive box 180. However, as used herein the term lead post 180 encompasses both a lead post 180 and a lead drive box 180 in either configuration of a fixed position motor 240 or a motor 240 that moves with the lead post 180.

It is also noted that, while the exemplary embodiment shown and described with respect to FIGS. 1A-1C is directed to a single accordion-type door 120, other movable partitions may be utilized. For example, a two-door, or bi-part door, system may be utilized wherein two similarly configured doors extend across a space and join together to form an appropriate barrier. Also, the present disclosure may be applicable to movable partitions or barriers other than the accordion-type doors that are shown and described herein in example embodiments.

Figure 2:
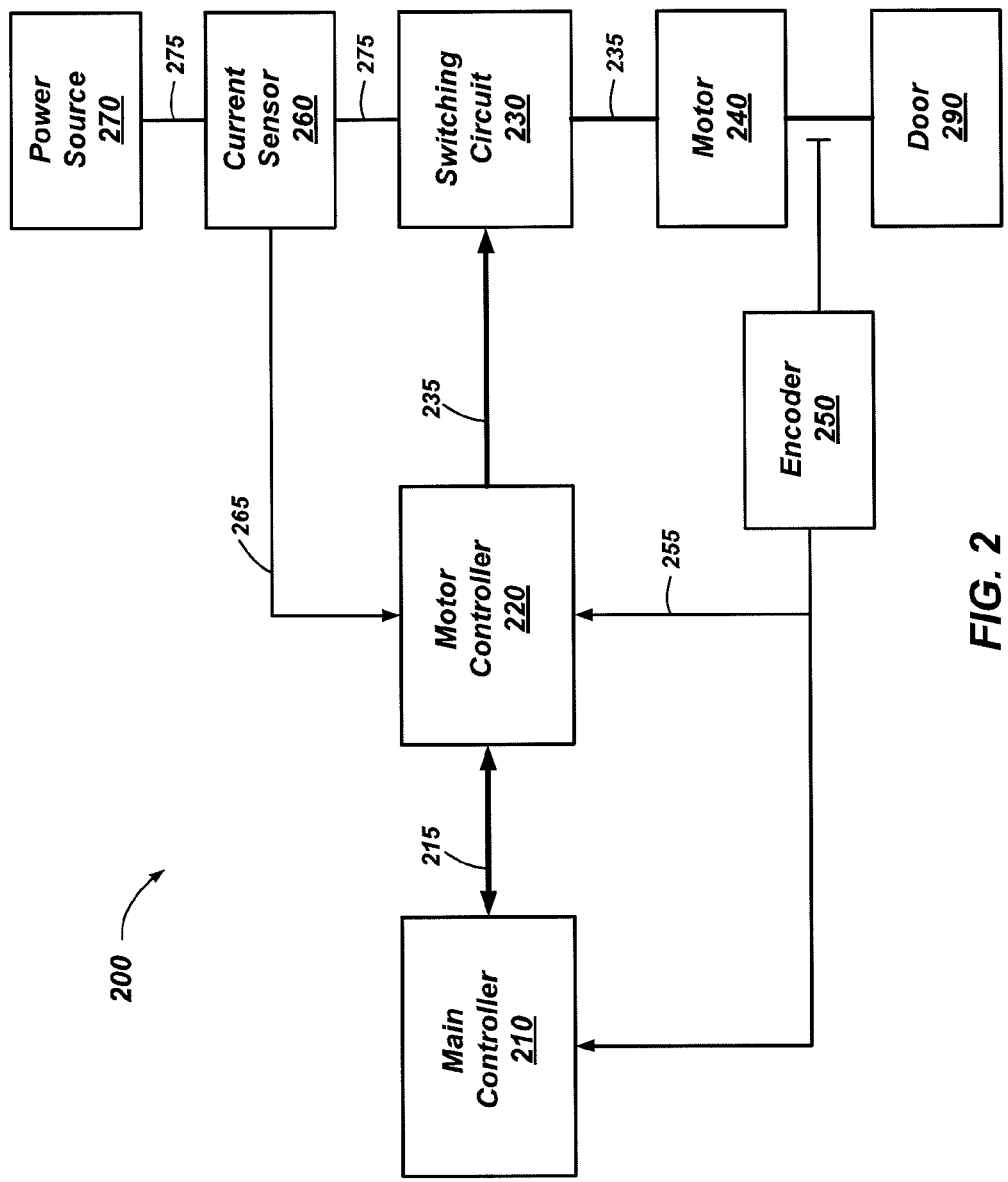
FIG. 2 is a simplified block diagram of a door control system for controlling movement and speed of the movable partition in accordance with an embodiment of the present disclosure.

FIG. 2 is a simplified block diagram of a door control system 200 for controlling movement and speed of the movable partition 120 in accordance with an embodiment of the present disclosure. The door control system 200 may be configured to monitor an operational cycle of the movable partition 120 from a fully extended configuration to a fully retracted configuration and from the retracted configuration to the extended configuration. The door control system 200 may include a main controller 210 for controlling and monitoring overall operation of the movable partition 120 and the lead post 180.

A motor controller 220 monitors and controls operation of a motor 240 as it drives the movable partition 120. The main controller 210 and the motor controller 220 may communicate over bus 215 to share operation and control information related to the motor 240 and the movable partition 120.

Conventionally, movable partition systems 100 have been configured to open or close the movable partition 120 at about 6 inches per second to about 24 inches per second. However, at high speeds, significant stress may be placed on the motor 240 due to high current, or significant stress may be placed on the mechanical systems due to an encountered obstruction or upon reaching a fully extended position or a fully retracted position. Embodiments of the present disclosure may be configured to limit the speed increase of the motor 240, and thereby the speed increase of the lead post 180, when the movable partition 120 is in an almost fully extended position or an almost fully retracted position to reduce these stresses.

In addition, startup current for a conventional DC motor may be very high. For example, a one-half horsepower motor 240 that normally has operational current of about 17 amps may have startup currents in excess of 120 amps. Embodiments of the present disclosure may be configured to reduce the speed of the motor 240, and thereby the speed of the lead post 180, when the motor 240 is first starting up to reduce these high startup currents.

As the movable partition 120 approaches a fully retracted position, the panels 104 begin getting closer and closer together, which may cause an increased air pressure between the panels 104 because the air between the panels 104 cannot escape as fast as the panels 104 are closing together. Conversely, when starting from a fully retracted position, as the panels 104 begin to move apart, a reduced air pressure may develop between the panels 104 because air cannot enter between the panels 104 as fast as the panels 104 are moving apart.

As used herein, the term "billowing effect" is used to describe both the increased air pressure and the reduced air pressure that may be encountered as the movable partition 120 moves to or from the fully retracted position.

Embodiments of the present disclosure may be configured to reduce the billowing effect that might be present by reducing the speed of the motor 240, and thereby the speed of the lead post 180, to create improved airflow around the panels 104.

Reduced air pressure, can apply additional force to the panels 104 and, as a result the lead post 180 and the motor 240. Similarly, increased air pressure can apply additional force to the panels 104 and, as a result, the lead post 180 and the motor 240. In addition, the panels 104 may billow out relative to each other, which may cause them to encounter obstructions that they might not normally encounter if they weren't billowed out. As a non-limiting example, and as shown in FIG. 1C, the billowed panels 104 may run into sides of the wall 110A when moving into the pocket 108.

The main controller 210 and the motor controller 220 may be any suitable controller or processor and may be configured to monitor the state of a movable device (e.g., a movable door or a movable partition), monitor other aspects related to the control of the movable device, and thereby operate the movable device under a defined set of parameters or rules. The main controller 210 may be further configured to transmit one or more control signals via bus 215 to the motor controller 220 related to an operation of the movable device, such as, for example only, an "open" operation signal, a "close" operation signal, or a "brake" operation signal.

A current sensor 260 may be coupled to a power source 270 via a power signal 275 and may be configured to provide power to the motor 240 and possibly various other components of the door control system 200. The current sensor 260 may comprise any sensor suitable for generating an analog or digital current signal 265, wherein the current signal 265 is proportional to the amount of current flowing from the power source 270 to the motor 240. The current sensor 260 configured to generate an analog signal may be coupled to an analog-to-digital converter to sample the input and convert it to a digital value suitable for use by the motor controller 220. The analog-to-digital convertor may comprise a stand-alone analog-to-digital converter coupled between the current sensor 260 and the motor controller 220 or an analog-to-digital converter included in the motor controller 220. A current sensor 260 configured to generate a digital signal may directly interface to the motor controller 220 to present a digital value suitable for use by the motor controller 220. By way of example only, and not by way of limitation, the current sensor 260 may comprise a conventional Hall Effect current sensor 260, as will be understood by a person having ordinary skill in the art.

The motor 240 may be mechanically coupled with a door 290 (e.g., a movable partition 120 or lead drive box 180) to open or close the door 290 as the motor 240 rotates.

An encoder 250 including one or more sensors (not shown) may generate rotation signals 255 for the motor controller 220. The rotation signals 255 can be used to indicate relative position between components of the motor 240, such as between a rotor and a stator of the motor 240. The motor controller 220 can use the rotation signals 255 to determine position, speed, and rotation direction of the motor 240. From these positions, speed, and direction parameters of the motor 240, position, speed, and direction parameters for the door 290 may be estimated. In one embodiment, the encoder 250 may be a magnetic encoder. In another embodiment, the encoder 250 may include an optical encoder using an LED to emit light onto a codewheel surface, projecting an image back on a photodetector, causing the output to change as the rotatable drive member 190 (FIG. 1C) rotates. However, it will be appreciated by those of ordinary skill in the art that other components may be used for the encoder 250. In addition, while the description generally discusses rotation of the motor 240, the encoder 250 may be configured to sense rotation of a shaft of the motor 240, a gearbox attached to the motor 240, or a chain or belt attached to the gearbox or motor 240. Additional details of the encoder 250, and use thereof, are discussed below with reference to FIGS. 5A and 5B.

A switching circuit 230 may be coupled between the power source 270 and the motor 240 to control rotation, speed, and direction of the motor 240 responsive to motor control signals 235 from the motor controller 220. As a non-limiting example, in response to receiving an "open" control signal from the main controller 210, the motor controller 220 may be configured to transmit the motor control signals 235 to the switching circuit 230 to cause the motor 240 to rotate in a first rotational direction. Similarly, in response to receiving a "close" control signal from the main controller 210, the motor controller 220 may transmit the motor control signals 235 to the switching circuit 230 to cause the motor 240 to rotate in a second rotational direction. Furthermore, in response to receiving a "brake" control signal from the main controller 210, the motor controller 220 may transmit the motor control signals 235 to cause rotation of the motor 240 to cease in either direction.

Figure 3:
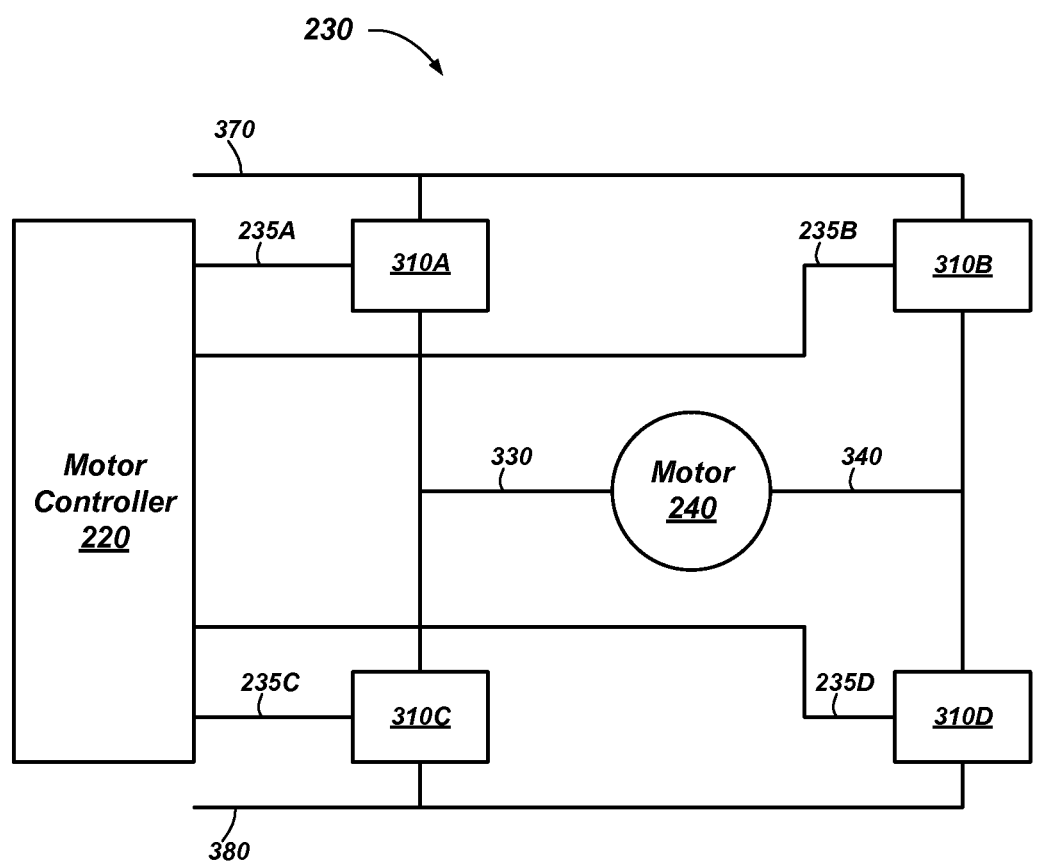
FIG. 3 is a simplified block diagram of an H-bridge configuration of switches as a possible switching circuit for controlling a motor.

FIG. 3 is a simplified block diagram of an H-bridge configuration of switches as a possible switching circuit 230 and the motor controller 220 for controlling the motor 240. The switching circuit 230 includes a first switching device 310A, a second switching device 310B, a third switching device 310C, and a fourth switching device 310D. As an example, and not by way of limitation, the switching devices (310A, 310B, 310C, and 310D) may each comprise relays. As another example, and not by way of limitation, the switching devices (310A, 310B, 310C, and 310D) may each comprise field effect transistors (FETs). Additionally, for example only, the first switching device 310A and the second switching device 310B may comprise p-channel devices and the third switching device 310C and the fourth switching device 310D may comprise n-channel devices.

As illustrated in FIG. 3, the first switching device 310A is operably coupled between a positive power source 370 and a first motor terminal 330 and is controlled by motor control signal 235A. The second switching device 310B is operably coupled between the positive power source 370 and a second motor terminal 340 and is controlled by motor control signal 235B. The third switching device 310C is operably coupled between a negative power source 380 and the first motor terminal 330 and is controlled by motor control signal 235C. The fourth switching device 310D is operably coupled between the negative power source 380 and the second motor terminal 340 and is controlled by motor control signal 235D.

As a non-limiting example, the positive power source 370 and the negative power source 380 may create a voltage differential suitable for driving a DC motor. A DC motor, as will be appreciated by those of ordinary skill in the art, may include a stator-rotor combination or a commutator-armature combination configured to effect rotational motion of an output component such as a shaft. In one particular embodiment, the present invention may be practiced with a motor rated at 12 volts DC or higher, such as a 24 volt DC motor, although motors of other voltages may be utilized.

In operation, the switching circuit 230 may be thought of as operating in a dynamic braking mode when motor control signal 235A and motor control signal 235B are each asserted and motor control signal 235C and motor control signal 235D are each negated. The switching circuit 230 may also operate in a dynamic braking mode when motor control signal 235A and motor control signal 235B are each negated and motor control signal 235C and motor control signal 235D are each asserted.

The switching circuit 230 may be thought of as operating in a rotational mode when motor control signal 235A and motor control signal 235D are each asserted and motor control signal 235B and motor control signal 235C are each negated. The switching circuit 230 may also operate in a rotational mode when motor control signal 235B and motor control signal 235C are each asserted and motor control signal 235A and motor control signal 235D are each negated.

In the rotational mode, the switching circuit 230 may cause the motor 240 to rotate in a first rotation direction or in a second rotation direction, depending on the state of the motor control signals (235A, 235B, 235C and 235D). In the rotational mode, the motor 240 is enabled to rotate because the first motor terminal 330 is operably coupled to the positive power source 370 and the second motor terminal 340 is operably coupled to the negative power source 380, or vice versa. More specifically, the motor 240 may rotate in the first rotation direction if motor control signal 235B and motor control signal 235C are each asserted while motor control signal 235A and motor control signal 235D are each negated. The first rotation direction is enabled because the asserted motor control signal 235B causes the second switching device 310B to conduct, and the asserted motor control signal 235C causes the third switching device 310C to conduct. Similarly, the negated motor control signal 235A and the negated motor control signal 235D prevent respective first and fourth switching devices 310A and 310D from conducting. As a result, the second motor terminal 340 connects to the positive power source 370 and the first motor terminal 330 connects to the negative power source 380, causing the motor 240 to rotate in the first rotation direction.

On the other hand, the motor 240 may rotate in the second rotation direction if the motor control signal 235B and motor control signal 235C are each negated while the motor control signal 235A and motor control signal 235D are each asserted. The second rotation direction is enabled because the asserted motor control signal 235A causes first switching device 310A to conduct, and the asserted motor control signal 235D causes fourth switching device 310D to conduct. Similarly, the negated motor control signal 235B and negated motor control signal 235C prevent respective second and third switching devices 310B and 310C from conducting. As a result, the first motor terminal 330 connects to the positive power source 370 and the second motor terminal 340 connects to the negative power source 380, causing the motor 240 to rotate in the second rotation direction.

As will be appreciated by one having ordinary skill in the art, the control signals (235A, 235B, 235C and 235D) may be configured as Pulse Width Modulation (PWM) signals and use pulse width modulation by the motor controller 220 to create the motor control signals (235A, 235B, 235C and 235D) in an appropriate manner to stop the motor 240 as well as control the direction of rotation of the motor 240. Moreover, by adjusting the pulse widths of the PWM signals, rotational speed of the motor may be adjusted, which in turn will adjust linear speed of the opening or closing door 290 (FIG. 2).

As a result, the motor 240 may be configured to start and stop slowly and, therefore, reduce wear and tear on the motor 240. This speed adjustment may also be used to reduce wear and tear on mechanical components of the movable partition system 100 (FIGS. 1A-1C) such as rotatable drive members (e.g., sprockets, gears, and pulleys) and to fixed drive members (e.g., chains, belts, and cables).

Figure 4:
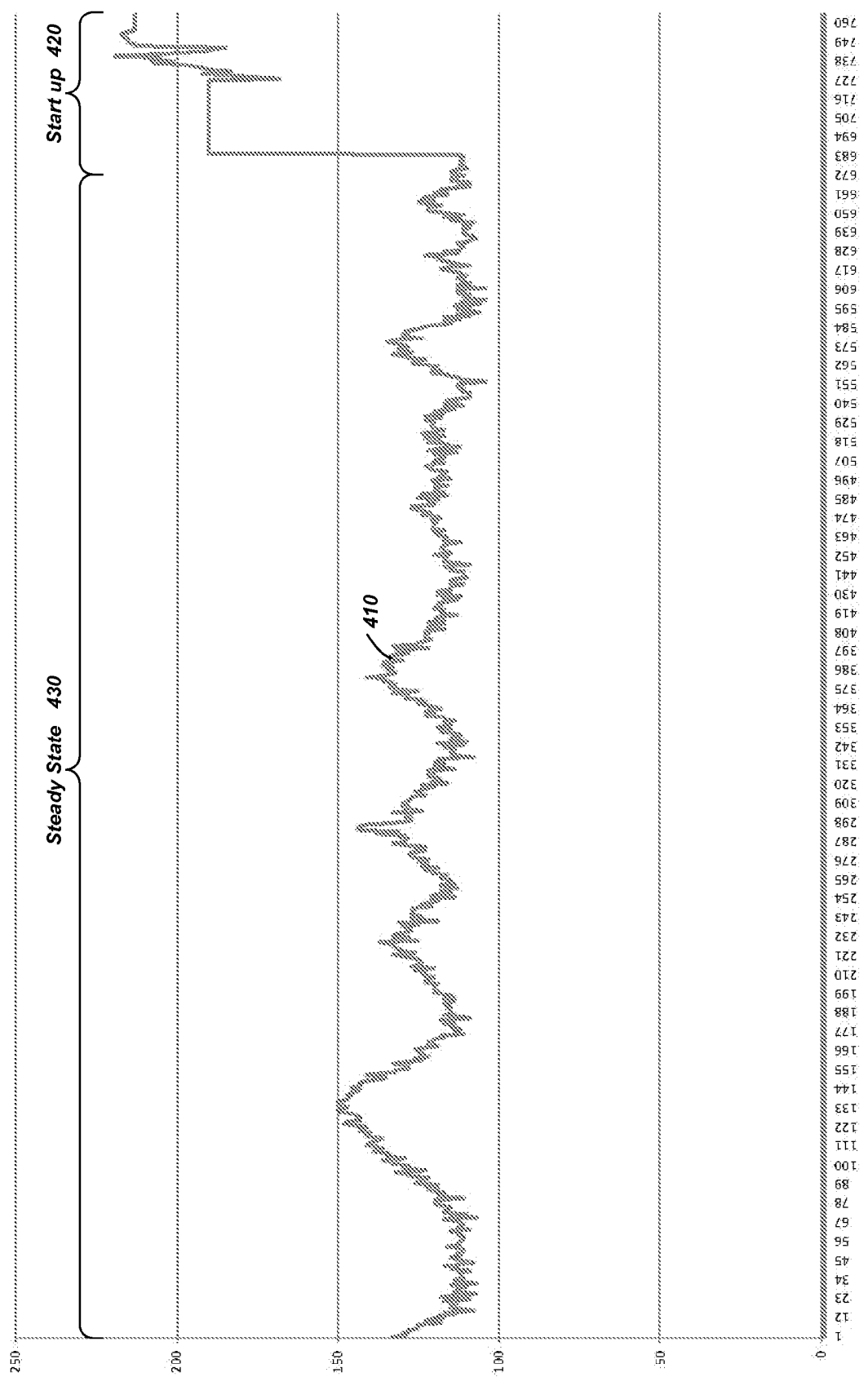
FIG. 4 illustrates an operational profile of sampled current values to the motor through an operational cycle of the movable partition.

FIG. 4 illustrates an operational profile 410 of sampled current values to the motor 240 (FIG. 2) through an operational cycle of the movable partition 120 (FIGS. 1A-1C). The Y-axis indicates current to the motor 240 and the X-axis indicates position of the door 290. With reference to FIGS. 2 and 4, the main controller 210 may be configured to transmit and receive one or more status signals via bus 215 to the motor controller 220 related to an operational state or status of the motor 240, the door 290, or a combination thereof. As non-limiting examples, status signals related to an operational state of the door 290 may comprise an alarm signal, a fault signal, a service signal, or a moving signal. Furthermore, the status signals related to an operational state of the motor 240 may comprise a start-up signal, a steady-state signal, an almost retracted signal, or an off signal.

In operation, motor control signals 235 may be communicated to the switching circuit 230 providing a current from the power source 270 to the motor 240. The provided current may be sensed with the current sensor 260 and the current signal 265, which may be proportional to the amount of current sensed, is communicated to the motor controller 220. The motor controller 220 may be configured to sample the signal at discrete positions (e.g., positions of the motor 240 or positions of the door 290) or discrete times to obtain a plurality of current values to generate the operational profile 410. The motor controller 220 may be configured to analyze the operational profile 410 obtained, as well as to compare the values to any previously acquired values.

In some applications, the motor 240 may require varying amounts of current during an operational cycle of the door 290. In other words, the current provided to the load may vary over the course of a single operational cycle. For example, as illustrated in FIG. 4, the motor 240 may require a higher current during a start-up mode 420 than what is required during a steady-state mode 430. Furthermore, the motor 240, the door 290, or both may encounter several irregularities or other anomalies during an operational cycle causing the current requirements to fluctuate even during the "steady state" mode. In some applications, certain fluctuations in the current requirements may signify a problem of some sort. For example, when the drive mechanism 322 (FIG. 1C) is stopped or substantially restrained from motion during an operational cycle, the motor 240 may require a substantially higher current as compared to a normal operation of the door 290. However, certain fluctuations may also be considered part of a normal operational cycle.

Figure 5A:
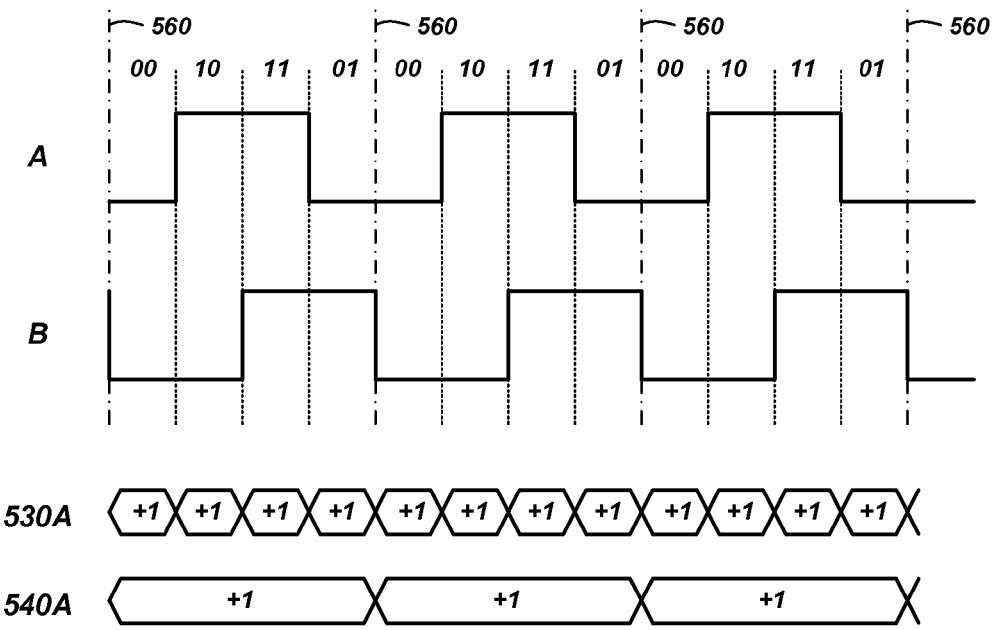
FIGS. 5A and 5B are timing diagrams illustrating quadrature signals, internal count and external count in accordance with an embodiment of the present disclosure.
Figure 5B:
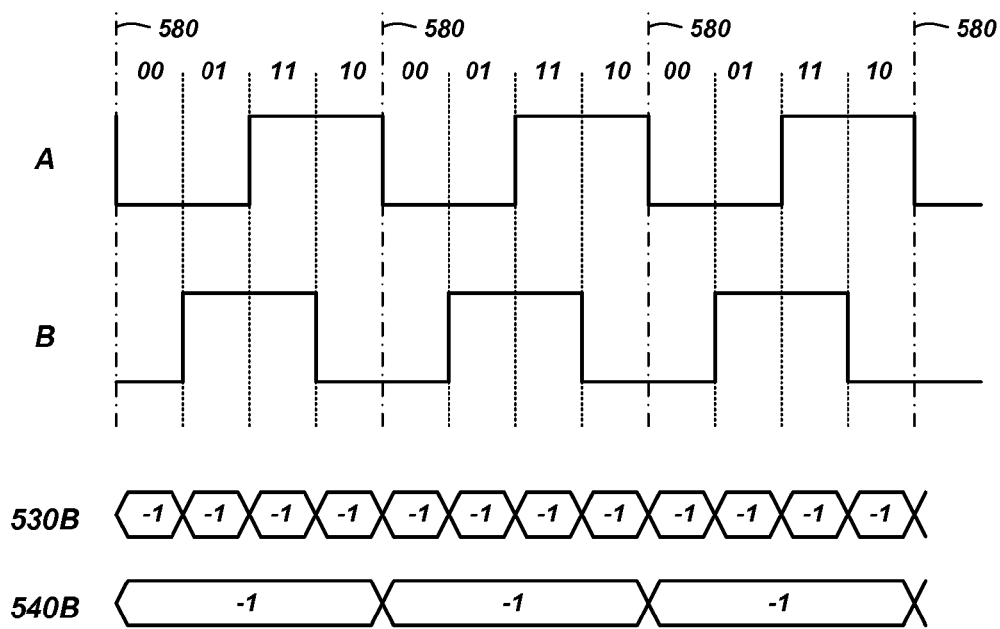

FIGS. 5A and 5B are timing diagrams illustrating quadrature signals 255 (FIG. 2) as a type of rotation signals 255, internal count 530 (530A for increments and 530B for decrements) and external count 540 (540A for increments and 540B for decrements) in accordance with an embodiment of the present disclosure. With reference to FIGS. 2, 5A, and 5B, the encoder 250 may be coupled to the motor 240 and may be configured to output the quadrature signals 255 (i.e., a first phase signal A and a second phase signal B) correlated to the relative position between the rotor and stator within the motor 240. If the first phase signal A leads the second phase signal B, then the direction of an associated motor may be deemed to be positive or forward. Conversely, if the first phase signal A trails the second phase signal B, then the direction of the motor may be deemed to be negative or reverse. Upon receipt of the quadrature signals A and B, the motor controller 220 may be configured to determine a rotational direction (may also be referred to herein as an operational direction) of the motor 240 and track a rotational speed (may also be referred to herein as an operational speed) of the motor 240 and a corresponding linear speed of the door 290 by either incrementing the internal count 530 at each combinational logic state (i.e., "00," "10," "11," and "01") in a forward rotational cycle, as shown in FIG. 5A or decrementing the internal count 530 at each combinational logic state (i.e., "00," "01," "11," and "10") in a reverse rotational cycle, as shown in FIG. 5B.

The motor controller 220 may also be configured to increment an external count 540A or decrement an external count 540B after completion of a complete cycle (as indicated by lines 560 in FIG. 5A and lines 580 in FIG. 5B). The complete cycle of the first phase signal A and the second phase signal B (i.e., after first phase signal A and second phase signal B have transitioned through each combinational logic state, "00," "10," "11," and "01" for a forward rotation or "00," "01," "11," and "10" for a reverse rotation).

Stated another way, upon receipt of quadrature signals A and B from the encoder 250, the motor controller 220 may determine a rotational direction of an associated motor 240 and monitor a rotational position of the motor 240 by maintaining the internal count 530, the external count 540, or a combination thereof. Thus, width of the door 290 and position of the lead post 180 may be determined by the number of quadrature pulses. For example, in an embodiment with a 10-tooth sprocket, ½ inch in chain pitch means there are 5 inches of travel of the lead post 180 for each revolution of the motor 240. In other words, tracking the number of pulses can keep track of the lateral position of the lead post 180 throughout its full travel length.

Determination of the position of the lead post 180 may be desirable so that the movable partition system 100 may be able to properly control the speed of the motor 240, and thereby the movable partition 120 during periods of interest of the operational cycle.

Moreover, if the quadrature signals 255 are correlated to a known time base, such as, for example, a clock, a rotational speed of the motor 240 may be determined and, as a result, a proportional linear speed of the lead post 180 (FIGS. 1A-1C).

Figure 6:
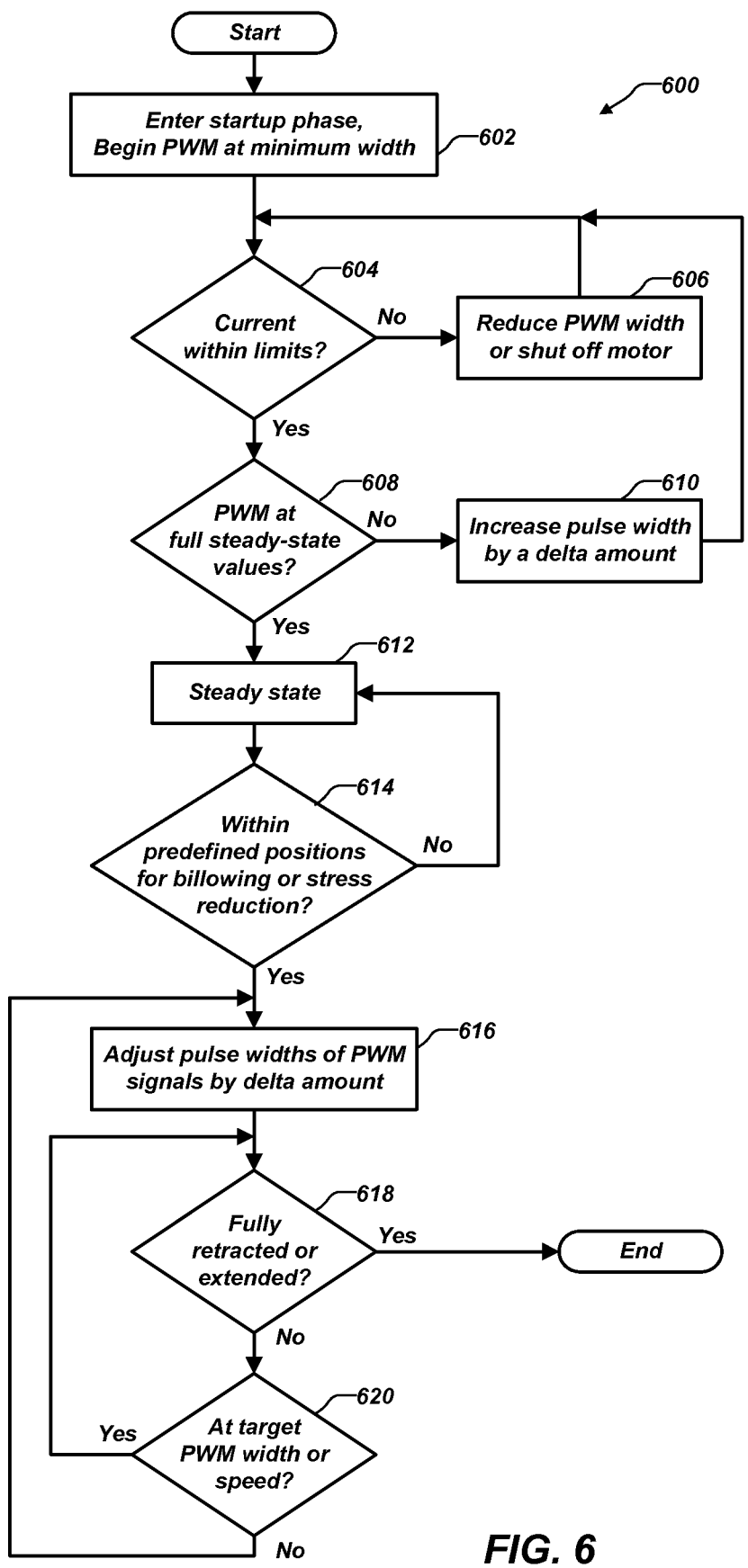
FIG. 6 is a simplified flow diagram illustrating acts performed in controlling speed of the movable partition in accordance with an embodiment of the present disclosure.

FIG. 6 is a simplified flow diagram 600 illustrating acts performed in controlling speed of the movable partition 120 in accordance with an embodiment of the present disclosure. While discussing FIG. 6, reference will also be made to FIGS. 1A-1C and FIG. 2. At operation block 602 the movable partition system 100 enters a startup phase wherein the motor 240 would begin to turn. Prior to turning, the motor controller 220 may set up the PWM signals 235 with a minimum pulse width acceptable for beginning rotation of the motor 240 and lateral movement of the door 290.

Decision block 604 indicates a test to determine if current to the motor 240 is within a predefined limit. This test can function to verify that current to the motor 240 during the startup phase stays within safe limits and that mechanical stresses on the movable partition system 100 stay within safe limits. If the current is not within the predefined limit, operation block 606 indicates that the pulse widths of the PWM signals 235 may be reduced by a delta amount to reduce current. If the pulse widths are already at the minimum amount, the process may stop the motor 240. Thus, a loop through decision block 604 and operation block 606 creates a feedback loop to maintain current to the motor 240 and forces on the door 290 within desired limits.

If the current is within the predefined limit, decision block 608 indicates a test to determine if pulse widths of the PWM signals 235 are at their desired steady-state values. If not, operation block 610 indicates that the pulse widths of the PWM signals 235 may be increased by a delta amount to increase current and, as a result, speed of the motor 240 and door 290. Thus, a loop through decision block 604, decision block 608, and operation block 610 creates a ramp up of current and speed until the desired steady-state values are reached. In some embodiments, the delta amount of increase in operation block 610 may be configured to create a linear increase. In other embodiments, the delta amounts may change for different iterations through the loop to create other, more complex increases, such as, for example, a parabolic increase to gradually approach steady state.

The acts and decisions that may be performed in blocks 602, 604, 606, 608, and 610 comprise acts and decision that may be performed during a startup-phase.

If the PWM signals 235 are at the desired pulse width in decision block 608, then operation block 612 indicates that the door 290 has reached and is operating in a steady state. While not shown, it should be apparent that a feedback loop may also be used in the steady state to ensure that current to the motor 240 stays within acceptable limits.

Decision block 614 indicates a test to determine if the lead post 180 has reached a position that may be indicative of the beginning of the billowing effect, if the lead post 180 has reached a position that may be indicative of potentially harmful stress on the mechanical components, or a combination thereof. If not, the process loops back to operation block 612 to continue steady-state operation.

If the predefined position of the lead post 180 has been reached, operation block 616 indicates that the pulse widths of the PWM signals 235 may be increased or decreased by a delta amount to increase or decrease rotational speed of the motor 240 and lateral speed of the door 290.

Decision block 618 tests to see if the door 290 has been fully retracted or fully extended. If so, the process ends. If not, decision block 620 tests to see if the pulse widths of the PWM signals 235 have reached their desired width. If so, the process may loop back to decision block 618 to see if the door 290 is fully retracted or fully extended.

If the pulse widths of the PWM signals 235 have not reached their desired limit in decision block 620, the process may loop back to operation block 616 to adjust the pulse widths by a new delta amount. Thus, a loop through operation block 616, decision block 618, and decision block 620, creates a ramp down of current and speed until the desired pulse widths are reached. In some embodiments, the delta amount of decrease in operation block 616 may be configured to create a linear decrease. In other embodiments, the delta amounts may change for different iterations through the loop to create other, more complex increases, such as, for example, a parabolic decrease to gradually approach the reduced speed that is desired.

The acts and decisions that may be performed in blocks 614, 616, 618, and 620 comprise acts and decision that may be performed during an ending phase, a billowing reduction phase, or a combination thereof.

Various predefined positions for the startup phase, the ending phase, and the billowing reduction phase may be preset based on the type of movable partition system 100. Alternatively, the predefined position may be configured by a user based on observations of how the movable partition system 100 is performing.

As stated earlier, acts and decisions can be performed in parallel, substantially concurrently, or in sequences different than those shown in FIG. 6. As a non-limiting example, when the door 290 is extending, reducing current for the billowing effect may occur with or after reducing current for the startup phase.

While the invention is susceptible to various modifications and implementation in alternative forms, specific embodiments have been shown by way of examples in the drawings and have been described in detail herein. However, it should be understood that the invention is not intended to be limited to the particular forms disclosed. Rather, the invention includes all modifications, equivalents, and alternatives falling within the scope of the following appended claims and their legal equivalents.

What is claimed is

1. A motor control system for motivating a movable partition, comprising:
    a motor for mechanical coupling to the movable partition;
    a switching circuit operably coupled to the motor for selectively coupling the motor to a positive power source and a negative power source responsive to one or more PWM signals;
    an encoder configured for generating one or more rotation signals indicative of operational direction and operational speed of the motor; and
    a motor controller operably coupled to the switching circuit and the encoder and configured for improving airflow around foldable panels of the movable partition and reducing a billowing effect caused by air between the foldable panels by adjusting pulse widths of the one or more PWM signals from a previous pulse width to control a rotational speed of the motor responsive to a determination that the movable partition is in a position that is between a predefined position and a fully retracted position.

2. The motor control system of claim 1, wherein the motor controller is configured to adjust pulse widths of the one or more PWM signals to improve the airflow around the foldable panels when the movable partition is being retracted.

3. The motor control system of claim 1, wherein the lead post comprises a lead drive box including the motor disposed therein.

4. The motor control system of claim 1, further comprising:
    a current sensor operably coupled between the motor and at least one of the positive power source and the negative power source and configured to generate a current signal indicative of current through the motor; and
    wherein the motor controller is further configured for reducing current spikes to the motor during a startup phase of the motor, an ending phase of the motor, or a combination thereof by adjusting the pulse widths of the one or more PWM signals responsive to the current signal.

5. The motor control system of claim 1, further comprising:
    a current sensor operably coupled between the motor and at least one of the positive power source and the negative power source and configured to generate a current signal indicative of current through the motor; and
    wherein the motor controller is further configured for reducing stresses on mechanical components operably coupled between the motor and the movable partitions during a startup phase of the motor, an ending phase of the motor, or a combination thereof by adjusting pulse widths of the one or more PWM signals responsive to the current signal.

6. The motor control system of claim 1, wherein the motor controller is further configured for generating the one or more PWM signals to adjust a rotational direction of the motor.

7. The motor control system of claim 6, wherein:
    the switching circuit comprises an H-bridge configuration of switches; and
    the motor controller is further configured for generating the one or more PWM signals as four signals configured for operating the H-bridge configuration of switches to cause rotation of the motor by pulse-width modulating at least one of the four signals.

8. The motor control system of claim 1, wherein the motor controller is further configured for:
    determining if the movable partition is between the predefined position and the fully retracted position by analyzing the one or more rotation signals; and
    determining the rotational speed of the motor and a proportional linear position of the movable partition by analyzing the one or more rotation signals relative to a known time base.

9. The motor control system of claim 1, wherein the one or more rotation signals comprise quadrature signals.

10. The motor control system of claim 1, wherein the motor controller is further configured for:
    determining the movable partition is between the predefined position and the fully retracted position by analyzing the one or more rotation signals; and
    determining the rotational speed of the motor and a proportional linear position of the movable partition by analyzing the one or more rotation signals relative to a known time base.

11. The motor control system of claim 1, wherein the predefined position is a position indicative of the billowing effect occurring for the foldable panels of the movable partition system.

12. The motor control system of claim 1, wherein the motor controller is further configured for maintaining the pulse widths of the one or more PWM signals in a steady state responsive to a determination that the moveable partition is in a position that is prior to the predefined position.

13. The motor control system of claim 1, wherein adjusting pulse widths of the one or more PWM signals from a previous pulse width includes decreasing the pulse widths by a delta amount.

14. The motor control system of claim 1, wherein adjusting pulse widths of the one or more PWM signals from a previous pulse width includes increasing the pulse widths by a delta amount.

15. A movable partition system, comprising:
    a movable partition comprising coupled foldable panels engaged with and movable along a track extending longitudinally between a first end and a second end;
    a lead post coupled to the movable partition and the track; and
    a motor control system, comprising:
        a motor for mechanical coupling to the movable partition;
        a switching circuit operably coupled to the motor for selectively coupling the motor to a positive power source and a negative power source responsive to one or more PWM signals;
        an encoder configured for generating one or more rotation signals indicative of operational direction and operational speed of the motor; and a motor controller operably coupled to the switching circuit and the encoder and configured for improving airflow around foldable panels of the movable partition and reducing a billowing effect caused by air between the foldable panels by adjusting pulse widths of the one or more PWM signals to control a rotational speed of the motor responsive to a determination that the lead post of the movable partition is between a predefined position and a fully retracted position.

16. The movable partition system of claim 15, wherein the motor controller is configured to adjust pulse widths of the one or more PWM signals to improve the airflow around the foldable panels when the movable partition is being retracted.

17. The movable partition system of claim 16, wherein the motor controller is configured to maintain the pulse widths of the one or more PWM signals in a steady state prior to the lead post reaching the predetermined location during retraction.

18. The movable partition system of claim 15, wherein the lead post comprises a lead drive box including the motor disposed therein.

19. The movable partition system of claim 15, wherein the motor is positioned proximate the first end or the second end.

20. The movable partition system of claim 15, further comprising:
a current sensor operably coupled between the motor and at least one of the positive power source and the negative power source and configured to generate a current signal indicative of current through the motor; and
wherein the motor controller is further configured for reducing current spikes to the motor during a startup phase of the motor, an ending phase of the motor, or a combination thereof by adjusting the pulse widths of the one or more PWM signals responsive to the current signal.

21. The movable partition system of claim 15, further comprising:
a current sensor operably coupled between the motor and at least one of the positive power source and the negative power source and configured to generate a current signal indicative of current through the motor; and
wherein the motor controller is further configured for reducing stresses on mechanical components operably coupled between the motor and the movable partition during a startup phase of the motor, an ending phase of the motor, or a combination thereof by adjusting pulse widths of the one or more PWM signals responsive to the current signal.

22. The movable partition system of claim 15, wherein the motor controller is further configured for generating the one or more PWM signals to adjust a rotational direction of the motor.

23. The movable partition system of claim 22, wherein:
the switching circuit comprises an H-bridge configuration of switches; and
the motor controller is further configured for generating the one or more PWM signals as four signals configured for operating the H-bridge configuration of switches to cause rotation of the motor by pulse-width modulating at least one of the four signals.

24. The movable partition system of claim 15, wherein the predefined position is a position indicative of the billowing effect occurring for the foldable panels of the movable partition system.

25. The movable partition system of claim 15, wherein the motor controller is configured for adjusting the pulse widths of the one or more PWM signals by decreasing the pulse widths in a linear manner as the lead post moves between the predefined position and the fully retracted position during retraction.

26. The movable partition system of claim 15, wherein the motor controller is configured for adjusting the pulse widths of the one or more PWM signals by decreasing the pulse widths in a parabolic manner as the lead post moves between the predefined position and the fully retracted position during retraction.

* * * * *